UNITED STATES PATENT OFFICE.

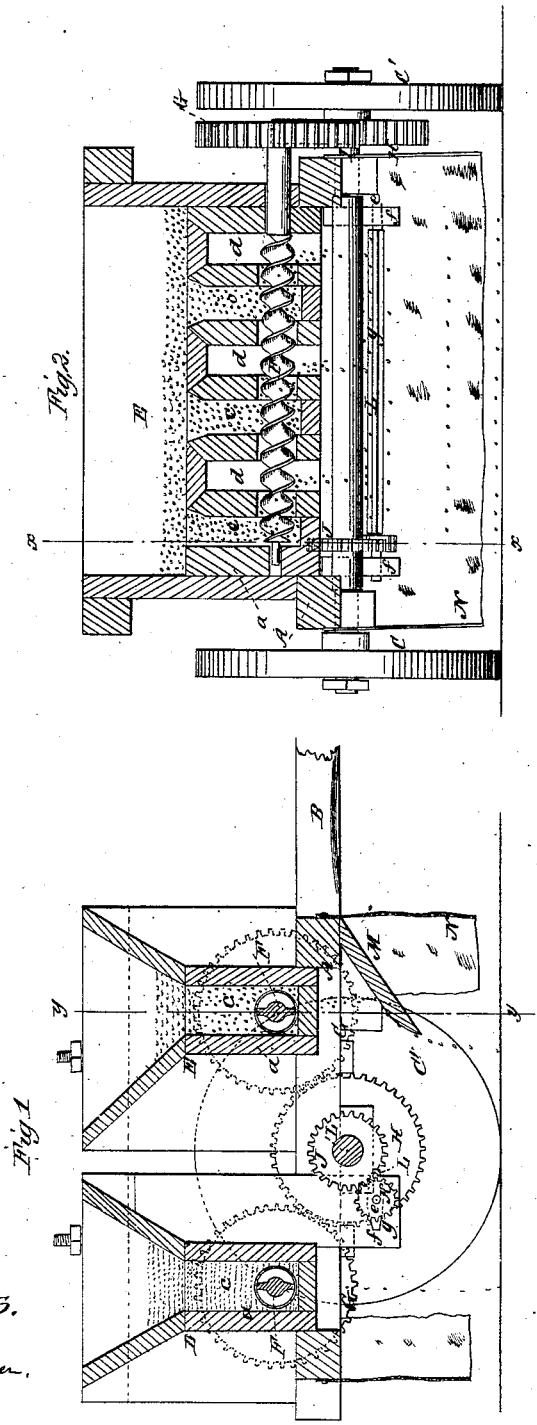

W. D. MASON, OF JARRATT'S, VIRGINIA.

IMPROVEMENT IN SOWING-MACHINES.

Specification forming part of Letters Patent No. 29,897, dated September 4, 1860.

*To all whom it may concern:*

Be it known that I, W. D. MASON, of Jarratt's Depot, in the county of Sussex and State of Virginia, have invented a new and Improved Machine for Sowing Broadcast Seed and Pulverulent Manures; and I do hereby declare that the following is a full, clear, and exact description of the same, reference being had to the annexed drawings, making a part of this specification, in which—

Figure 1 is a side sectional view of my invention, taken in the line $x\ x$, Fig. 2; Fig. 2, a front sectional view of the same, taken in the line $y\ y$, Fig. 1.

Similar letters of reference indicate corresponding parts in the two figures.

This invention consists in the employment or use of peculiarly-constructed hoppers and screws, arranged with a working-fan and inclined distributing-board, to operate as hereinafter fully shown and described. The object of the invention is to obtain a simple device for sowing seed and pulverulent manures evenly, so that equal quantities will be distributed over equal areas of ground.

To enable those skilled in the art to fully understand and construct my invention, I will proceed to describe it.

A represents a rectangular frame of suitable dimensions, with a draft-pole, B, secured to its front end. The frame A is mounted on wheels C C', and has two hoppers, D E, placed in it, one at its front and the other at its back part. The hoppers D E extend the whole width of the frame A, and their lower parts, $a$, are of rectangular form and their upper parts, $b$, of flaring form, as shown clearly in Fig. 1. The lower rectangular parts, $a$, of the hoppers are divided into a series of compartments, $c$, with chambers $d$ between them, said chambers being open at their bottoms, as shown clearly in Fig. 2. Through the lower part, $a$, of each hopper a screw, F, passes. These screws pass through the lower parts of the compartments $c$ and chambers $d$, and each screw has a toothed wheel, G, at one end, and these toothed wheels gear into a wheel, H, which is on the axle I of the wheels C C'.

On the axle I there is placed a wheel, J, which gears into a pinion, K, on a shaft, $e$, which shaft is fitted in pendent bearings $f$, attached to the frame A. The shaft has wings $g$ attached to it, the shaft and wings forming a fan, L, which is below and a short distance in front of hopper D.

To the front part of the frame A, and to its under side, there is attached an inclined board, M, said board projecting downward and backward, and extending the whole width of the frame below hopper E.

The operation is as follows: As the machine is drawn along the screws are rotated by means of the gearing G G H, and the seed and manure in the hoppers D E are fed out from the compartments $c$ and discharged from the lower ends of the chambers $d$, as will be fully understood by referring to Fig. 2. The seed is placed in the front hopper, E, and is discharged upon the inclined board M, from which it falls and is evenly distributed on the ground. The manure is placed in the back hopper, D, and as it falls from the chambers $d$ of its hopper the fan L, which is rotated by the gearing J K, scatters the manure evenly.

To the frame A there is a cloth or apron, N, attached, said apron extending down within a short distance of the ground and preventing the wind acting upon the falling seed and manure—a contingency which would often prevent an even sowing of the seed and manure.

By having the screens arranged with the compartments $c$ and chambers $d$, as shown, the seed and manure are very regularly sown, being discharged in small droppings from different parts of the hopper in line with each other, and as the operation of the screws is arbitrary the device cannot become choked or clogged.

I would remark that the screws F need not be continuous ones. The portions within the compartments $c$ should have the spiral flange; but smooth portions of a rod may connect said flanges, the smooth portions being in the chambers $d$.

I am aware that rotating screws have been used in seeding and analogous machines, and I do not claim separately such device; but I do claim as new and desire to secure by Letters Patent—

1. The combination of the rotating screws F with the hoppers D E when the latter are divided at their lower part into compartments $c$ and chambers $d$, substantially as and for the purpose specified.

2. In connection with the hoppers D E, the rotating fan L and inclined board M, as and for the purposes set forth.

W. D. MASON.

Witnesses:
THOMAS J. FOX,
JOHN W. WALTON.